(12) United States Patent
Chen et al.

(10) Patent No.: US 8,988,444 B2
(45) Date of Patent: Mar. 24, 2015

(54) SYSTEM AND METHOD FOR CONFIGURING GRAPHICS REGISTER DATA AND RECORDING MEDIUM

(75) Inventors: Szu-Chieh Chen, Hsinchu (TW);
Yi-Ping You, Hsinchu (TW);
Ming-Yung Ko, Taipei (TW)

(73) Assignee: Institute for Information Industry, Taipei (TW)

( * ) Notice: Subject to any disclaimer, the term of this patent is extended or adjusted under 35 U.S.C. 154(b) by 218 days.

(21) Appl. No.: 13/327,944

(22) Filed: Dec. 16, 2011

(65) Prior Publication Data

US 2013/0155087 A1 Jun. 20, 2013

(51) Int. Cl.
*G09G 5/02* (2006.01)
*G06T 15/00* (2011.01)
*G09G 5/36* (2006.01)

(52) U.S. Cl.
CPC .............. *G06T 15/005* (2013.01); *G09G 5/363* (2013.01)
USPC .......................................................... 345/559

(58) Field of Classification Search
None
See application file for complete search history.

(56) References Cited

U.S. PATENT DOCUMENTS

| 7,769,728 B2* | 8/2010 | Ivie ................................ 712/24 |
| 8,509,069 B1* | 8/2013 | Poon et al. ..................... 370/230 |
| 2006/0010292 A1* | 1/2006 | DeVale et al. ................. 711/118 |
| 2010/0269651 A1* | 10/2010 | Graushar et al. .............. 707/693 |
| 2011/0291866 A1* | 12/2011 | Kuroki et al. ...................... 83/13 |
| 2013/0080738 A1* | 3/2013 | Plondke et al. ................. 712/24 |
| 2014/0092123 A1* | 4/2014 | Hamada et al. ............... 345/619 |

OTHER PUBLICATIONS

Processor add data memory remaining space—Google Scholar.*

* cited by examiner

*Primary Examiner* — David Zarka
*Assistant Examiner* — Khoa Vu
(74) *Attorney, Agent, or Firm* — Muncy, Geissler, Olds & Lowe, P.C.

(57) ABSTRACT

A system and method for configuring graphics register data and a recording medium are applied in a mobile device to store graphics operation data for displaying a picture. The system includes a plurality of register modules and an operation module. The operation module obtains unstored data from the graphics operation data, judges whether a register module already stored with data and having a configuration space sufficient for configuring the unstored data exists among all the plurality of register modules, so as to determine whether to store the unstored data into the register module already stored with data or a register module without storing-data, and when no register module without storing data exists and the configuration space of each register module already stored with data is insufficient for storing the unstored data, divides and stores the unstored data into a part of the plurality of register modules already stored with data.

17 Claims, 11 Drawing Sheets

SYSTEM AND METHOD FOR CONFIGURING GRAPHICS REGISTER DATA AND RECORDING MEDIUM

BACKGROUND OF THE INVENTION

1. Field of Invention

The present invention relates to a system and method for configuring register data and a recording medium, and more particularly, to a system and method for configuring graphics register data and a recording medium, which are capable of changing the data storage mode according to the data storage state of the register.

2. Related Art

Nowadays, electronic devices capable of displaying pictures from different manufacturers use different image display techniques. All the image display techniques use simple primitives to draw complex three-dimensional images. For example, an image display process of the Open Graphics Library Embedded System 2.0 (OpenGL ES2.0) with pipeline type shown in FIG. 1 is one of the image display techniques.

The process basically includes: issuing a drawing command by an application programming interface (API) (Step S101), performing primitive processing (Step S103) in combination with vertex buffer object processing (Step S102), calculating a graphic shading start point and color distribution values according to graphic vectors generated after the primitive processing by a vertex shader (Step S104), performing primitive assembly according to the processing results of the primitive processing and the vertex shader (Step S105), analyzing and processing brightness and brightness contrast of graphic spaces and primitives by a rasterizer (Step S106), performing shading processing on graphic fragments by a fragment shader (Step S107), performing test and operation processes such as alpha test (Step S108), depth stencil (Step S109), color buffer blend (Step S110) and dither (Step S111), and then outputting graphics through a frame buffer (Step S112).

However, such image display techniques rely on the design, combination and drive of hardware and software provided by manufacturers. Therefore, such techniques require the use of electronic computing devices having high computing performance and abundant hardware resources, for example, computers or servers configured with graphic acceleration hardware (for example, graphics acceleration cards, chips or processors). In such electronic computing devices, when a graphic processing unit (GPU) compiles graphics, sufficient hardware resources are available for assisting operations, for example, when the vertex shading operation and the fragment shading operation are performed, the memory space of the computer is sufficient for the GPU to temporarily store a large volume of data, and other graphic acceleration hardware is used to execute other numerical operations of the image formation process, so as to efficiently present high-precision images, or accelerate the image presentation operation.

However, a portable mobile device such as a smart phone has no advantages in aspects of hardware update, replacement and extension, as compared with the high-performance electronic computing devices described above. Therefore, the GPU of the smart phone can only perform the graphic formation operation with limited hardware resources. The most obvious problem of the GPU lies in register resources. The GPU usually accesses a plurality of numerical values at different registers in a multi-way or multi-vector form. Therefore, the values of graphics data are formed in a rather distributed manner and stored in the registers, with significantly different densities of data storage. In the portable mobile device, this problem leads to that all the registers are used, but the GPU cannot completely configure all the graphics register data into the registers. As the remaining spaces of the registers cannot configure subsequent graphics register data, the GPU cannot complete graphics operations to present a demanded picture, and meanwhile, a considerable amount of hardware resources become idle. What's worse, the system of the portable mobile device may even break down due to insufficient hardware resources.

Therefore, how to improve the utilization efficiency of registers during graphics display operations is a problem to be considered by manufacturers.

SUMMARY OF THE INVENTION

To solve the above problems, the present invention is directed to a system and method for configuring graphics register data and a recording medium, which are applied to graphic display operations of a mobile device and capable of changing the data storage mode according to the data storage state of the register.

The present invention provides a system for configuring graphics register data, applied in a mobile device to temporarily store a plurality of pieces of graphics operation data for displaying a picture. The system comprises a plurality of graphic registers and an operation processor.

The operation processor obtains a piece of unstored data from the graphics operation data, judges whether a graphic register already stored with data and having a remaining configuration space sufficient for configuring the unstored data exists among all the plurality of graphic registers, so as to determine whether to store the unstored data into the graphic register already stored with data or to store the unstored data into a graphic register without storing data among the plurality of graphic registers, and when no graphic register without storing data exists and the remaining configuration space of each graphic register already stored with data is insufficient for storing the unstored data, divides and stores the unstored data in a distributed manner into a part of the graphic registers already stored with data.

The present invention provides a method for configuring graphics register data, applied in a mobile device to temporarily store a plurality of pieces of graphics operation data for displaying a picture, wherein the mobile device comprises a plurality of graphic registers and an operation processor. The method comprises: obtaining a piece of unstored data from the graphics operation data by the operation processor; judging whether a graphic register already stored with data and having a remaining configuration space sufficient for configuring the unstored data exists among the plurality of graphic registers by the operation processor, so as to determine whether to store the unstored data into the graphic register already stored with data; when judging that the remaining configuration space of each graphic register already stored with data is insufficient for storing the unstored data and a graphic register without storing data exists among the plurality of graphic registers, storing the unstored data into the graphic register without storing data by the operation processor; and when judging that no graphic register without storing data exists and the remaining configuration space of each graphic register already stored with data is insufficient for configuring the unstored data, dividing and storing the unstored data in a distributed manner into a part of the graphic registers already stored with data by the operation processor.

The present invention further provides a non-transitory recording medium, storing a computer readable program code, wherein a mobile device reads the program code to execute a method for configuring graphics register data, and the mobile device comprises a plurality of graphic registers and an operation processor and is used for temporarily storing a plurality of pieces of graphics operation data for displaying a picture. The process of the method is as described above, so that the details will not be described herein again.

The present invention is characterized in that, the graphics register data can be compactly configured into the storage spaces of the plurality of graphic registers, thereby improving the utilization ratio of the storage spaces of the plurality of graphic registers, and reducing the hardware idle ratio. Secondly, the mobile device can implement complex graphics processing operations by limited hardware resources without requiring additional hardware components or circuits, thereby improving the quality of image presentation. Thirdly, in subsequent graphics processing operations, only a very short time is additionally required for distributed data recovery and data movement, as compared with the graphics processing flow in the prior art, so that the overall load of the graphics processing operations is not greatly increased, or even the user experience is not affected, and meanwhile, the image quality can be improved, thereby effectively improving the applicability and practicability of the mobile device.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Preferred embodiments of the present invention are described in detail below with reference to the accompanying drawings.

Figure 1:
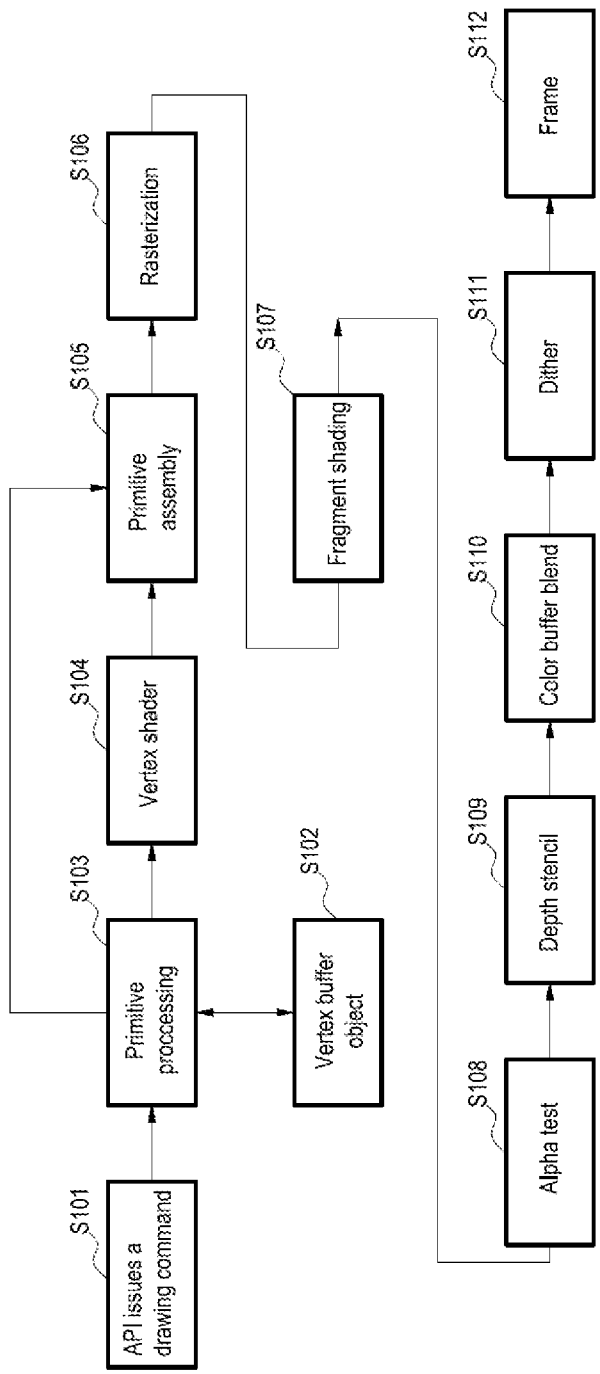
FIG. 1 is a schematic view of an image display process of the OpenGL ES2.0 with pipeline type in the prior art.
Figure 2:
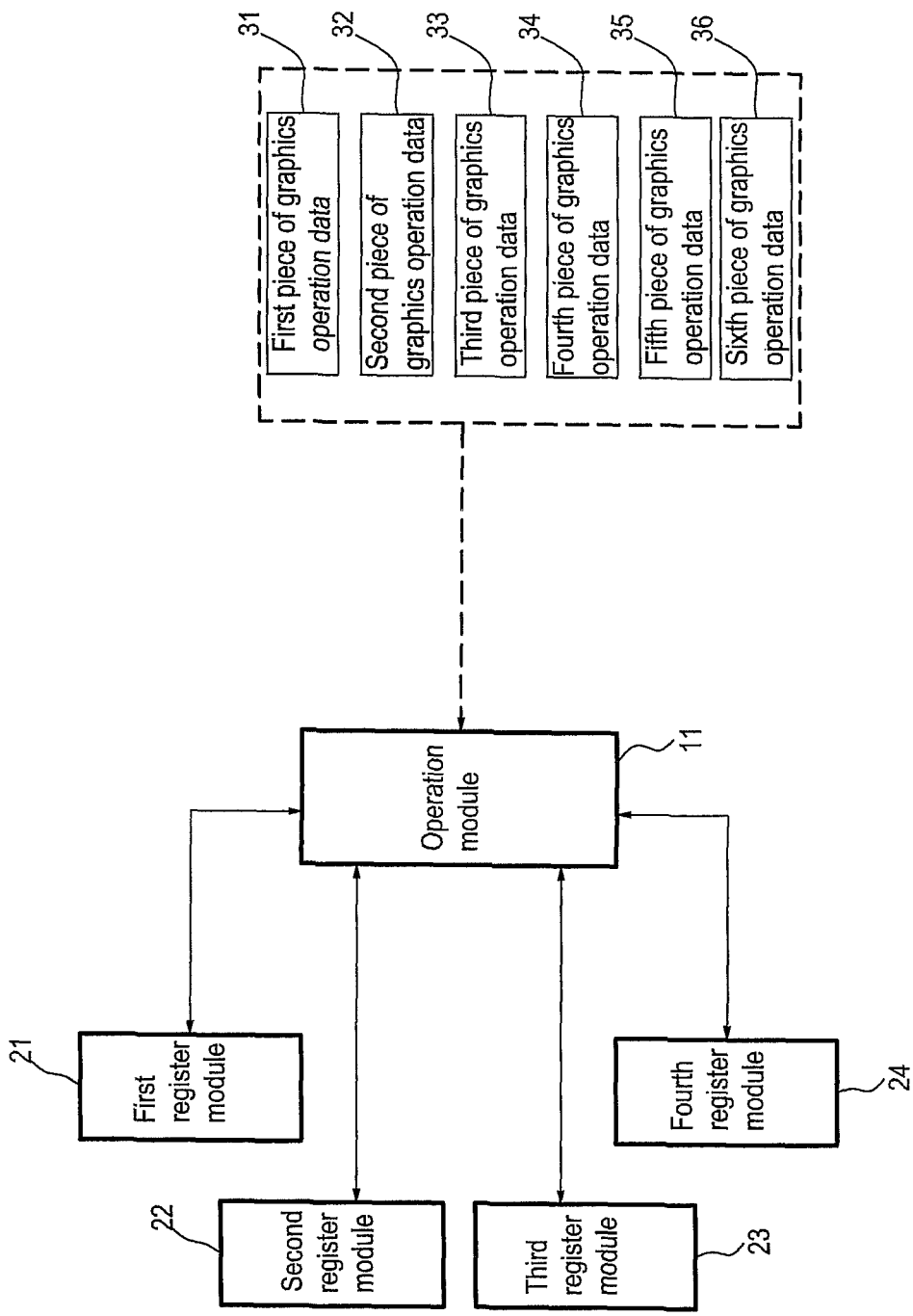
FIG. 2 is a schematic architectural view of a system for configuring graphics register data according to an embodiment of the present invention.

FIG. 2 is a schematic architectural view of a system for configuring graphics register data according to an embodiment of the present invention, and FIG. 3A to FIG. 3F are schematic views of configuring graphics register data according to an embodiment of the present invention. The system is applied in a mobile device to temporarily store a plurality of pieces of graphics operation data for displaying a picture. The system includes a plurality of register modules and an operation module 11. The operation module 11 may be a chip set, a processor unit (for example, GPU), an integrated circuit (IC), a control circuit, other auxiliary circuits or a combination of relevant modules or elements, and the register module may be a virtual or real memory of the computer or in a chip set, a processor unit (for example, GPU), an integrated circuit (IC), a control circuit, other auxiliary circuits or a combination of relevant units or elements. Operating software/firmware may be further included; for example, the operation module may be a compiler. The graphics operation data is used by the compiler for the graphics compile processing, but the present invention is not limited thereto.

Here, for example, four register modules are available, namely, a first register module 21, a second register module 22, a third register module 23 and a fourth register module 24. Each register module has a configuration space of four units (each block represents a unit), but the present invention is not limited thereto. The data volume of each unit is a bit, byte, or other units for calculating the data volume in the computer field, and the use of unit depends on hardware or program designers.

It is assumed that six pieces of graphics operation data need to be stored into the configuration spaces of the plurality of register modules. The first piece of graphics operation data 31 has a data volume of two units, the second piece of graphics operation data 32 has a data volume of three units, the third piece of graphics operation data 33 has a data volume of three units, the fourth piece of graphics operation data 34 has a data volume of two units, the fifth piece of graphics operation data 35 has a data volume of three units, and the sixth piece of graphics operation data 36 has a data volume of two units.

The operation module 11 obtains a piece of unstored data from all the graphics operation data. In this example, the operation module 11 first analyzes the graphics operation data to establish a storage sequence corresponding to the graphics operation data. There are two analysis modes:

(1) The operation module 11 sorts the graphics operation data according to data volumes. Therefore, the formed storage sequence is, for example, the fifth piece of graphics operation data 35, the second piece of graphics operation data 32, the third piece of graphics operation data 33, the first piece of graphics operation data 31, the sixth piece of graphics operation data 36, and the fourth piece of graphics operation data 34.

However, the arrangement sequence of the graphics operation data of the same data volume is not fixed, but depends on the sorting method used.

(2) Before one or more program codes or program segments corresponding to all the graphics operation data are executed, the operation module 11 analyzes the program codes to obtain a data read sequence according to which the graphics operation data is referred to by the program codes.

For example, the graphics operation data is read in the following sequence: the third piece of graphics operation data 33, the second piece of graphics operation data 32, the first piece of graphics operation data 31, the sixth piece of graphics operation data 36, the fourth piece of graphics operation data 34 and the fifth piece of graphics operation data 35. The operation module 11 uses the data read sequence as the storage sequence.

Here, an example is taken where the operation module 11 forms the storage sequence according to the read sequence of the graphics operation data.

Figure 3A:
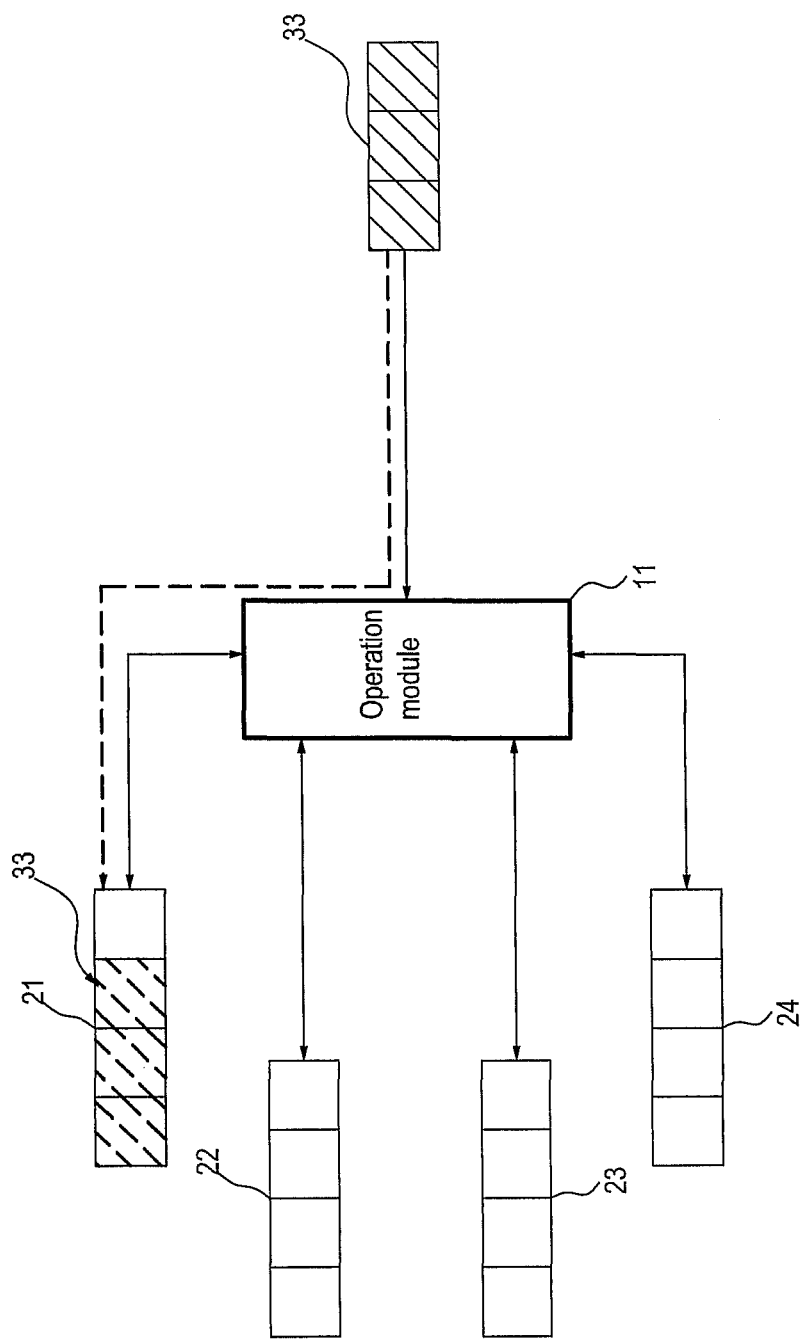
FIG. 3A to FIG. 3F are schematic views of configuring graphics register data according to an embodiment of the present invention.

Referring to FIG. 2 and FIG. 3A, according to the storage sequence, the operation module 11 first obtains the third piece of graphics operation data 33, which is the unstored data accordingly. The operation module 11 first judges whether a register module already stored with data and having a remaining configuration space sufficient for configuring the unstored data exists among all the plurality of register modules.

However, as none of the plurality of register modules is stored with data currently, the operation module 11 judges that no register module already stored with data is available for configuring the third piece of graphics operation data 33. Then, the operation module 11 judges whether a register module without storing data exists among all the plurality of register modules. At this time, as none of the plurality of register modules is stored with data, the operation module 11 selects a register module without storing data to store the third piece of graphics operation data 33. In this example, the first register module 21 is used to store the third piece of graphics operation data 33.

Figure 3B:
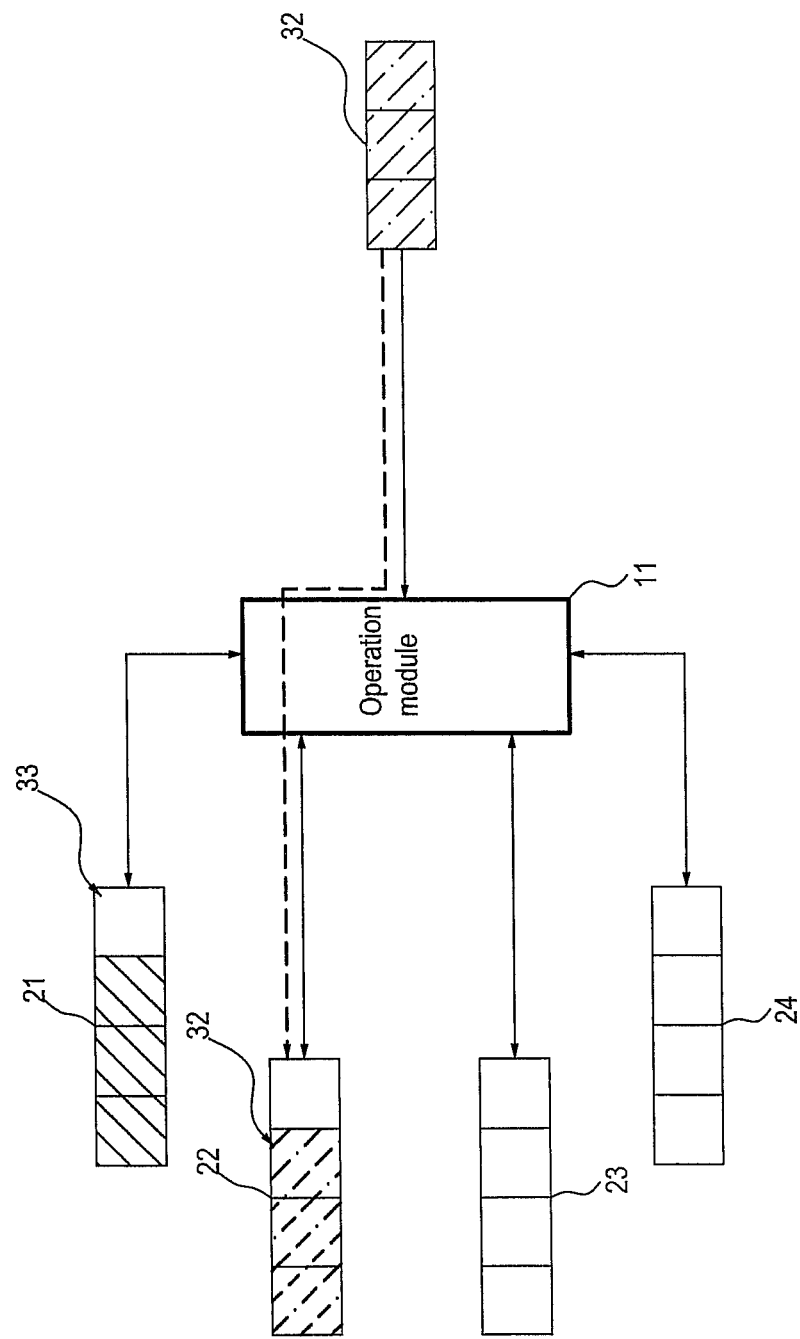

Referring to FIG. 2 and FIG. 3B, the operation module 11 obtains a piece of unstored data again from the remaining graphics operation data. According to the storage sequence, the operation module 11 obtains the second piece of graphics operation data 32 this time. The operation module 11 judges whether a register module already stored with data and having a remaining configuration space sufficient for configuring the unstored data exists among all the plurality of register modules. However, only the first register module 21 is a register module already stored with data, and the first register module 21 has a remaining configuration space of only one unit, which is insufficient for storing the second piece of graphics operation data 32. Therefore, the operation module 11 judges that no register module already stored with data is available for configuring the second piece of graphics operation data 32.

Then, the operation module 11 judges whether a register module without storing data exists among all the plurality of register modules. At this time, as the second register module 22 to the fourth register module 24 are without storing data, the operation module 11 selects a register module without storing data to store the second piece of graphics operation data 32. In this example, the second register module 22 is used to store the second piece of graphics operation data 32.

Figure 3C:
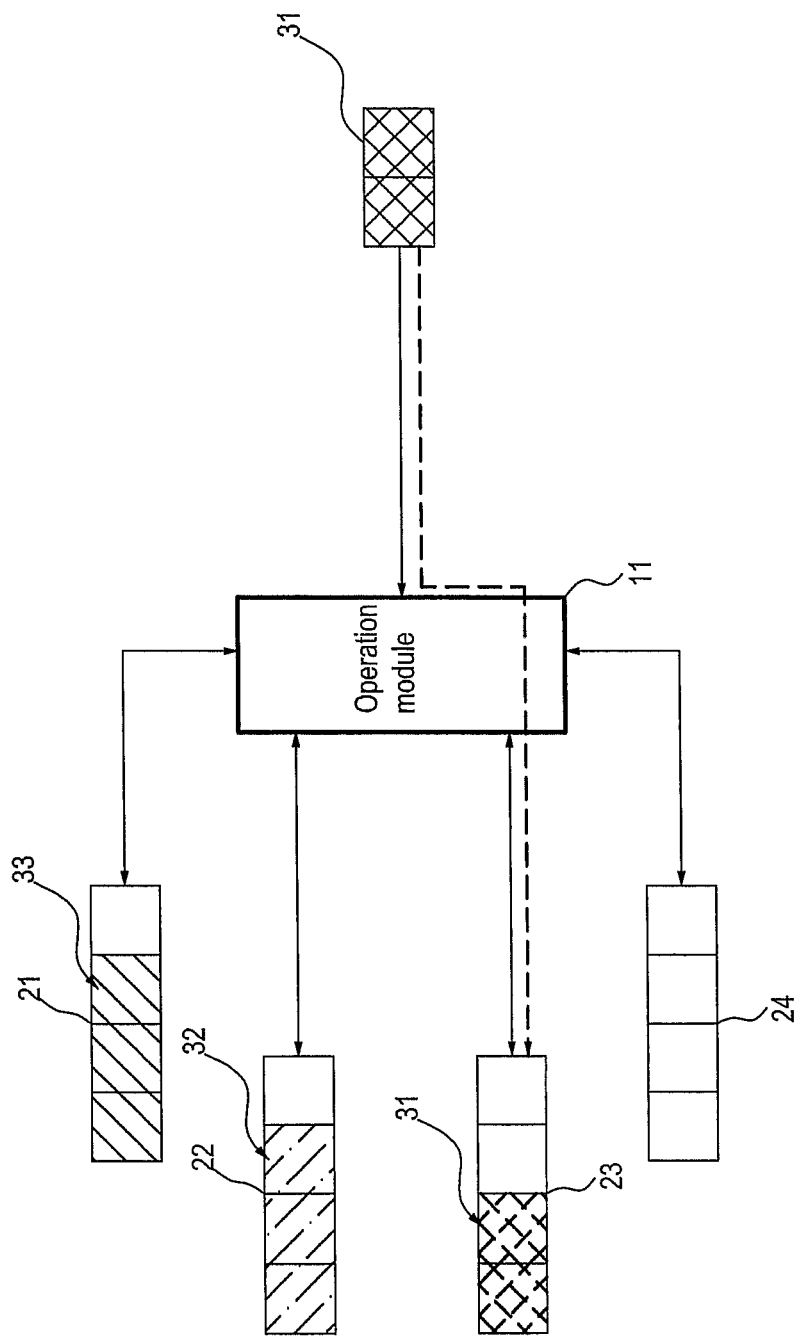

Referring to FIG. 2 and FIG. 3C, the operation module 11 obtains a piece of unstored data again from the remaining graphics operation data. According to the storage sequence, the operation module 11 obtains the first piece of graphics operation data 31 this time. The operation module 11 judges whether a register module already stored with data and having a remaining configuration space sufficient for configuring the unstored data exists among all the plurality of register modules. However, the first register module 21 and the second register module 22 are register modules already stored with data, and the first register module 21 and the second register module 22 each have a remaining configuration space of only one unit, which is insufficient for storing the first piece of graphics operation data 31. Therefore, the operation module 11 judges that no register module already stored with data is available for configuring the first piece of graphics operation data 31.

The operation module 11 judges whether a register module without storing data exists among all the plurality of register modules. At this time, as the third register module 23 and the fourth register module 24 are register modules without storing data, the operation module 11 selects a register module without storing data to store the first piece of graphics operation data 31. In this example, the third register module 23 is used to store the first piece of graphics operation data 31.

Figure 3D:
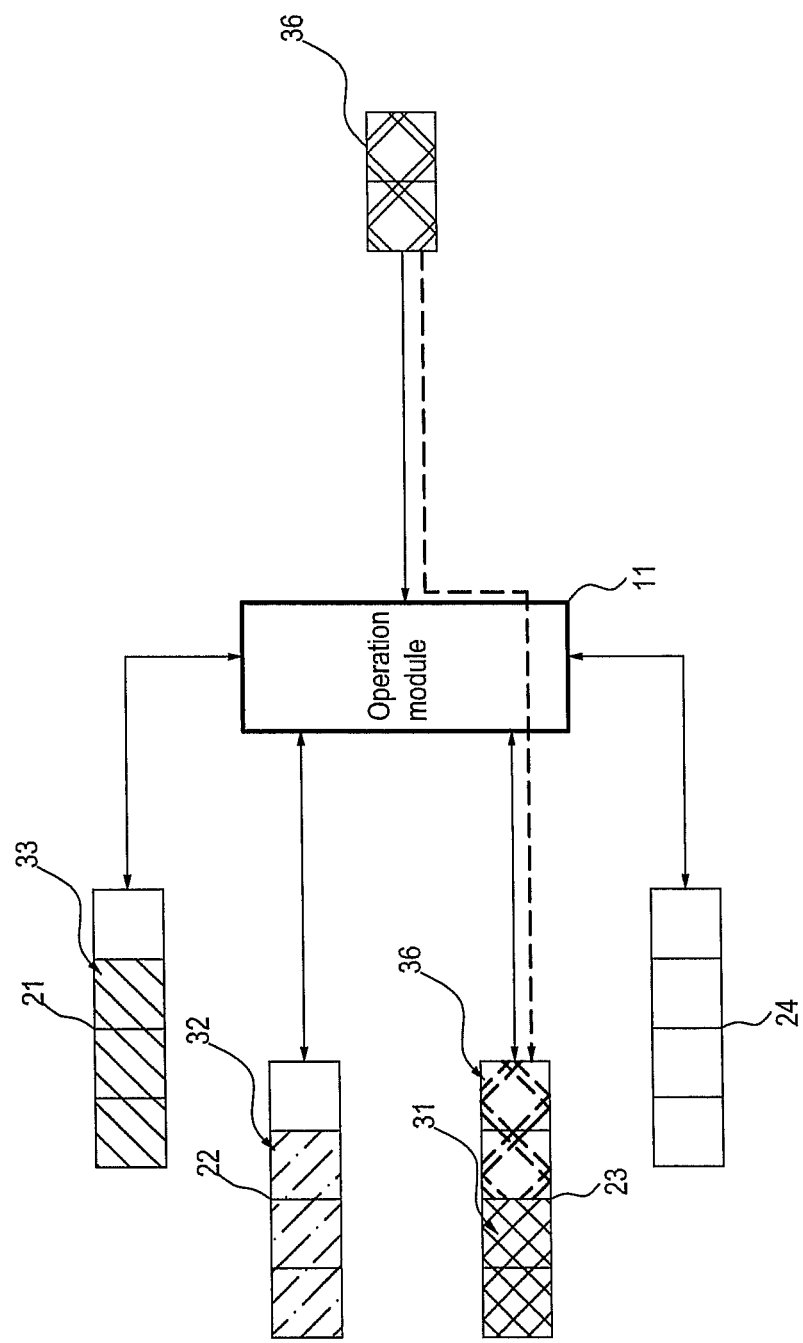

Referring to FIG. 2 and FIG. 3D, the operation module 11 obtains a piece of unstored data again from the remaining graphics operation data. According to the storage sequence, the operation module 11 obtains the sixth piece of graphics operation data 36 this time. The operation module 11 judges whether a register module already stored with data and having a remaining configuration space sufficient for configuring the unstored data exists among all the plurality of register modules. However, the first register module 21 to the third register module 23 are register modules already stored with data. The first register module 21 and the second register module 22 each have a remaining configuration space of only one unit, which is insufficient for storing the sixth piece of graphics operation data 36; while the third register module 23 has a remaining configuration space of two units, which is sufficient for storing the sixth piece of graphics operation data 36. Therefore, the operation module 11 judges that a register module already stored with data is available for configuring the sixth piece of graphics operation data 36, and stores the sixth piece of graphics operation data 36 into the third register module 23.

Figure 3E:
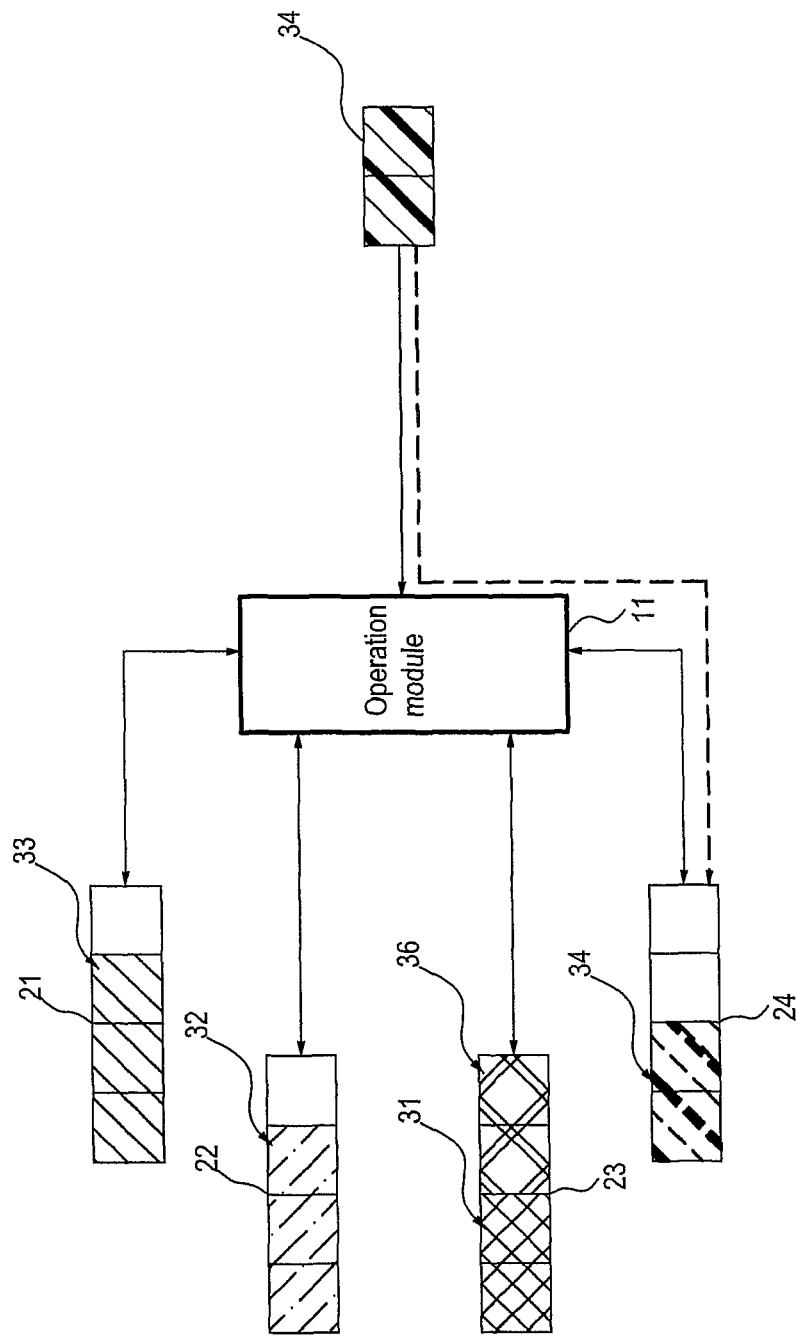

Referring to FIG. 2 and FIG. 3E, the operation module 11 obtains a piece of unstored data again from the remaining graphics operation data. According to the storage sequence, the operation module 11 obtains the fourth piece of graphics operation data 34 this time. The operation module 11 judges whether a register module already stored with data and having a remaining configuration space sufficient for configuring the unstored data exists among all the plurality of register modules. However, the first register module 21 to the third register module 23 are register modules already stored with data. The first register module 21 and the second register module 22 each have a remaining configuration space of only one unit, which is insufficient for storing the fourth piece of graphics operation data 34. Therefore, the operation module 11 judges that no register module already stored with data is available for configuring the fourth piece of graphics operation data 34.

Then, the operation module 11 judges whether a register module without storing data exists among all the plurality of register modules. At this time, the operation module 11 judges that the fourth register module 24 is without storing data, and accordingly, the operation module 11 stores the fourth piece of graphics operation data 34 into the fourth register module 24.

Figure 3F:
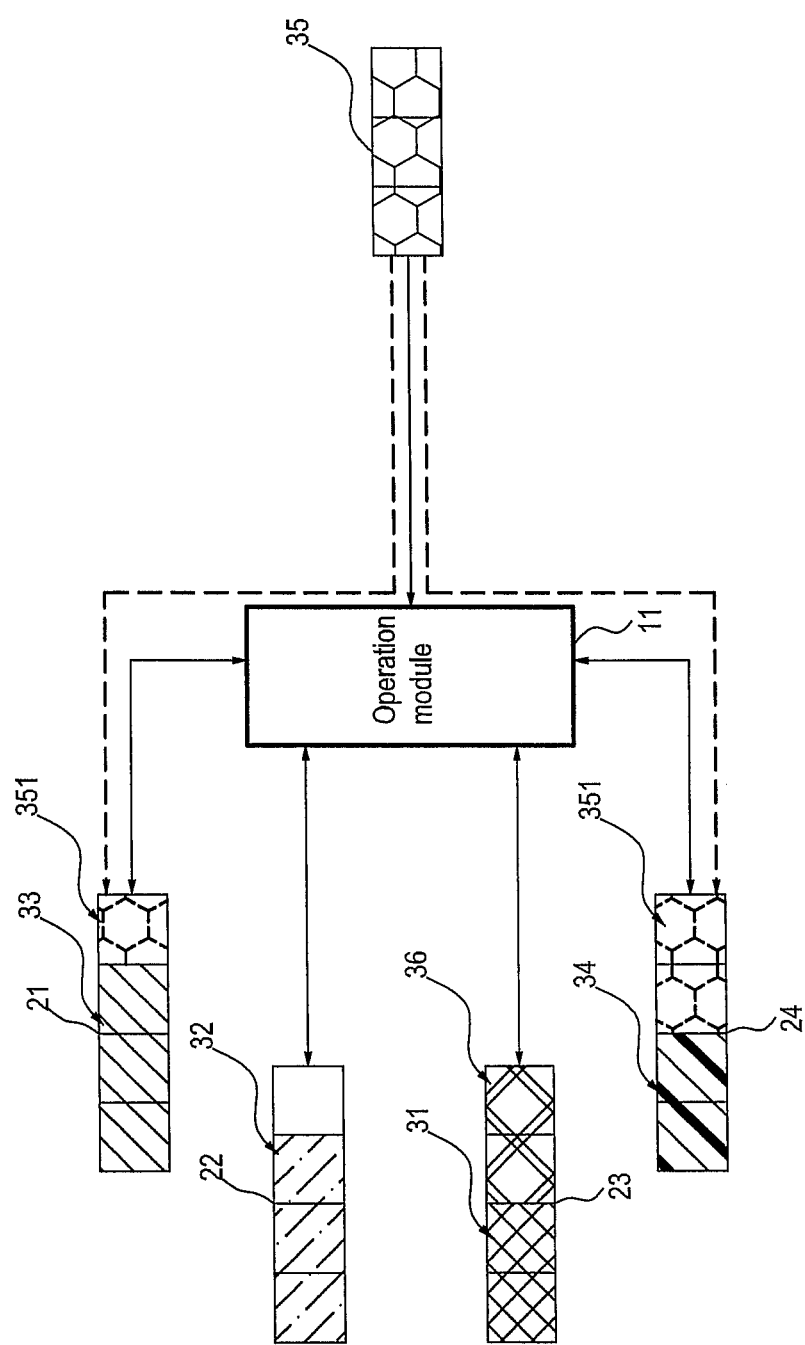

Referring to FIG. 2 and FIG. 3F, the operation module 11 obtains a piece of unstored data again from the remaining graphics operation data. According to the storage sequence, the operation module 11 obtains the fifth piece of graphics operation data 35 this time. The operation module 11 judges whether a register module already stored with data and having a remaining configuration space sufficient for configuring the unstored data exists among all the plurality of register modules. However, the first register module 21 to the fourth register module 24 are register modules already stored with data, and each have a remaining configuration space insufficient for storing the fifth piece of graphics operation data 35. Therefore, the operation module 11 judges that no register module already stored with data is available for configuring the fifth piece of graphics operation data 35.

Then, the operation module 11 judges whether a register module without storing data exists among all the plurality of register modules. At this time, the operation module 11 judges that no register module without storing data exists, and therefore, the operation module 11 divides and stores the unstored data in a distributed manner into a part of the register modules already stored with data.

For this example, the operation module 11 divides the fifth piece of graphics operation data 35 into a plurality of data segments 351, which is stored in a distributed manner into a combination of at least two register modules selected from the first register module 21, the second register module 22 and the fourth register module 24.

Moreover, when judging whether a register module already stored with data and having a remaining configuration space for configuring the unstored data exists among the plurality of register modules, the operation module 11 compares a data volume of the unstored data with the remaining configuration space of each register module already stored with data in a spatial first fit manner, a spatial best fit manner, a spatial worst fit manner, a spatial next fit manner or a combination thereof.

Figure 4:
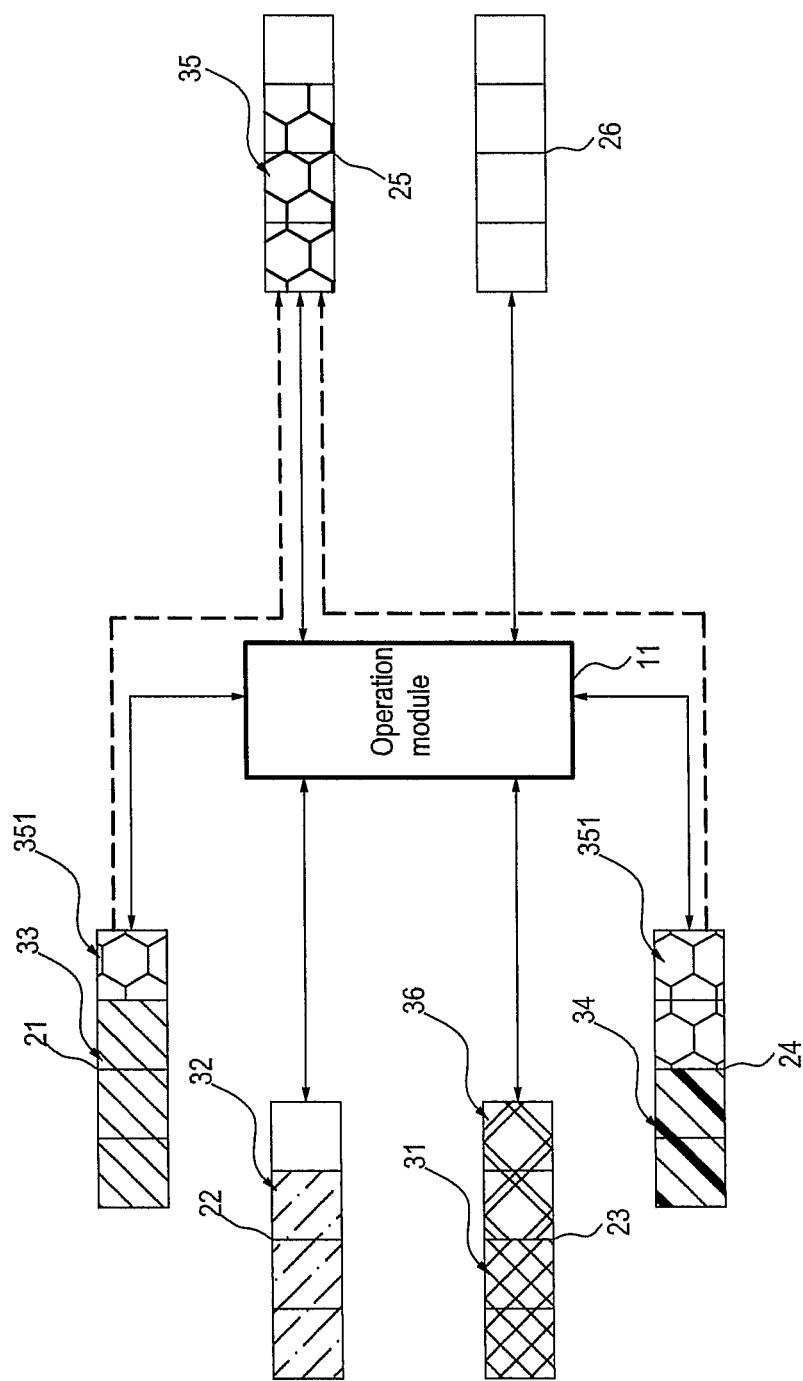
FIG. 4 is another schematic architectural view of a system for configuring graphics register data according to an embodiment of the present invention.

FIG. 4 is another schematic architectural view of a system for configuring graphics register data according to an embodiment of the present invention. Different from FIG. 2, the system further includes one or more data recovery register modules. The data recovery register modules are selected by the operation module 11 from all the plurality of register modules. For example, the operation module 11 can manage six register modules, among which the first register module 21 to the fourth register module 24 are used for storing graphics operation data, and a fifth register module 25 and a sixth register module 26 are used as data recovery register modules.

During execution of an executive program corresponding to the graphics operation data, when judging demand data required by the executive program is a plurality of data segments stored in a distributed manner in a part of the register modules already stored with data, the operation module 11 moves the data segments to one of the data recovery register modules, so as to recover the demand data. For example, the demand data is the fifth piece of graphics operation data 35, and the fifth piece of graphics operation data 35 has been divided into a plurality of data segments 351 and stored in a distributed manner in the first register module 21 and the fourth register module 24. In this case, the operation module 11 moves the data segments 351 to the fifth register module 25 (or the sixth register module 26), so as to recover the fifth piece of graphics operation data 35.

In addition, when dividing and storing the unstored data in a distributed manner into a part of the register modules already stored with data, the operation module 11 first analyzes the remaining configuration space of each register module already stored with data, obtains numbers of times of data movement required for recovering the unstored data when the data segments are configured in different combinations of the register modules already stored with data, and finds a minimum number of times of data movement, so as to store the unstored data in a distributed manner into a part of the register modules already stored with data corresponding to the minimum number of times of data movement.

For example, the operation module 11 obtains corresponding numbers of times of data movement when the fifth piece of graphics operation data 35 is configured in a distributed manner in a combination of the first register module 21 and the fourth register module 24, a combination of the second register module 22 and the fourth register module 24, and a combination of the first register module 21, the second register module 22 and the fourth register module 24. For example, for the combination of the first register module 21 and the fourth register module 24 and the combination of the second register module 22 and the fourth register module 24, the operation module 11 needs to perform data movement twice (the volumes of data to be moved are one unit and two units respectively); while for the combination of the first register module 21, the second register module 22 and the fourth register module 24, the operation module 11 needs to perform data movement three times (the volume of data to be moved is one unit each time). Therefore, the operation module 11 configures the fifth piece of graphics operation data 35 into the combination of the first register module 21 and the fourth register module 24, or the combination of the second register module 22 and the fourth register module 24.

Alternatively, when dividing and storing the unstored data in a distributed manner into a part of the register modules already stored with data, the operation module 11 divides the unstored data according to sizes of the remaining configuration spaces of the plurality of register modules already stored with data. For example, the operation module 11 analyzes the remaining configuration spaces of the first register module 21, the second register module 22 and the fourth register module 24, and learns that the fourth register module 24 has the largest remaining configuration space, which is of two units. The operation module 11 divides the fifth piece of graphics operation data 35 into a data segment 351 of two units and a data segment 351 of one unit, configures the data segment 351 of two units into the fourth register module 24, and configures the data segment 351 of one unit into the first register module 21 or the second register module 22.

Figure 5:
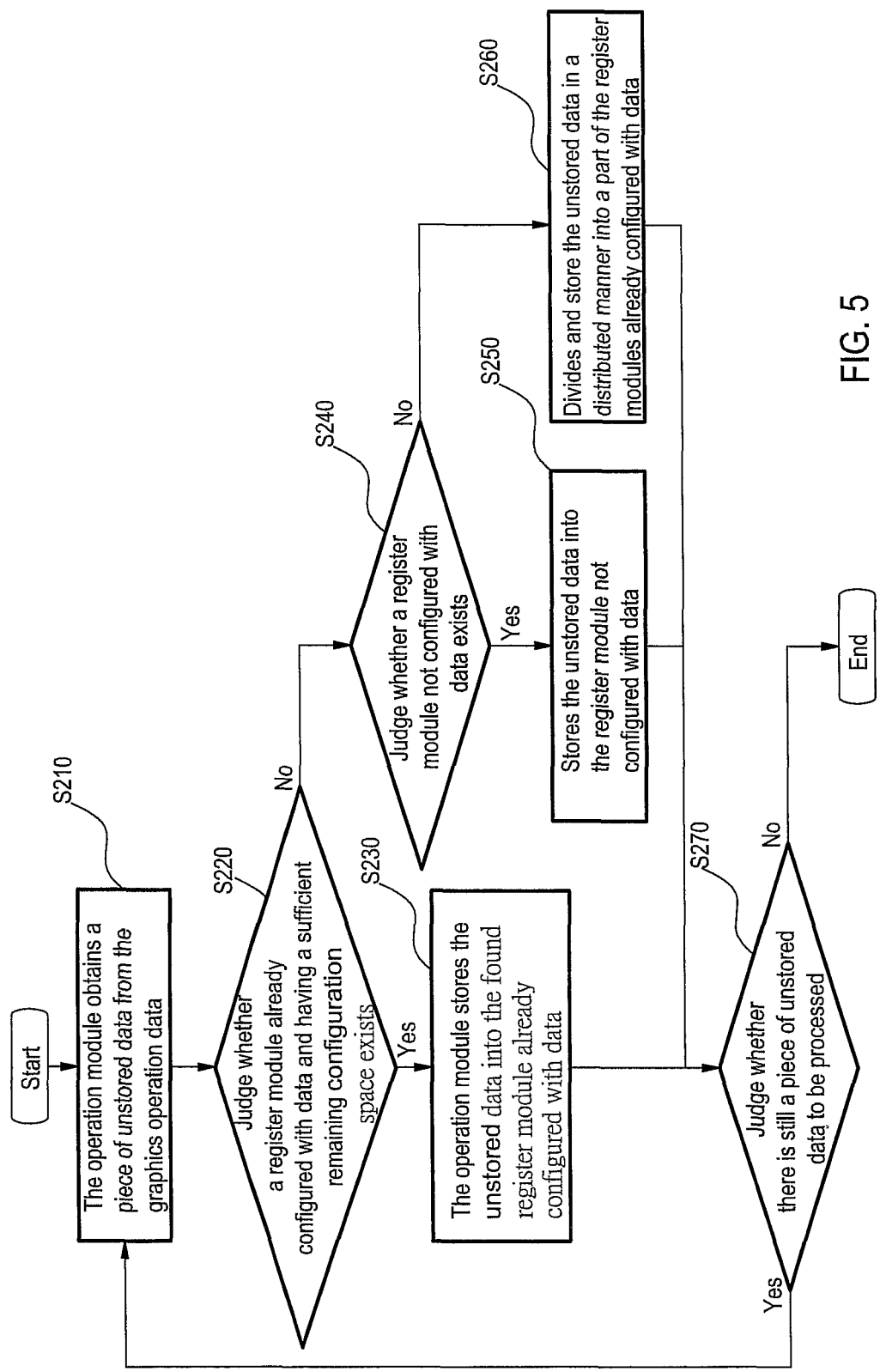
FIG. 5 is a schematic flow chart of a method for configuring graphics register data according to an embodiment of the present invention.

FIG. 5 is a schematic flow chart of a method for configuring graphics register data according to an embodiment of the present invention, which is applied in a mobile device to temporarily store a plurality of pieces of graphics operation data for displaying a picture. Further understandings can be achieved by referring to FIG. 2 to FIG. 4 and FIG. 5 together. The process is described below.

The operation module 11 obtains a piece of unstored data from the graphics operation data (Step S210). In this step, the operation module 11 analyzes the graphics operation data to establish a storage sequence corresponding to the graphics operation data, and obtains the unstored data from the graphics operation data according to the storage sequence.

The operation module 11 sorts the graphics operation data according to data volumes, so as to form the storage sequence. Alternatively, before a program code corresponding to the graphics operation data is executed, the operation module 11 analyzes the program code to obtain a data read sequence of the graphics operation data, and uses the data read sequence as the storage sequence.

The operation module 11 judges whether a register module already stored with data and having a remaining configuration space sufficient for configuring the unstored data exists among the plurality of register modules (Step S220).

The operation module 11 compares a data volume of the unstored data with the remaining configuration space of each register module already stored with data in a spatial first fit manner, a spatial best fit manner, a spatial worst fit manner or a spatial next fit manner.

When the operation module 11 judges that a register module already stored with data and having a remaining configuration space sufficient for configuring the unstored data exists, the operation module 11 stores the unstored data into the found register module already stored with data (Step S230).

On the contrary, when the operation module 11 judges that the remaining configuration space of each register module already stored with data is insufficient for storing the unstored data (also including the situation that no register module already stored with data exists), the operation module 11 judges whether a register module without storing data exists among all the plurality of register modules (Step S240).

When judging that a register module without storing data exists, the operation module 11 stores the unstored data into the register module without storing data (Step S250).

However, when judging that no register module without storing data exists and the remaining configuration space of each register module already stored with data is insufficient for configuring the unstored data, the operation module 11 divides and stores the unstored data in a distributed manner into a part of the register modules already stored with data (Step S260).

The operation module 11 first analyzes the remaining configuration space of each register module already stored with data, obtains numbers of times of data movement required for recovering the unstored data when the unstored data is divided into data segments and configured in different combinations of the register modules already stored with data, and finds a minimum number of times of data movement, so as to store the unstored data in a distributed manner into a part of the register modules already stored with data corresponding to the minimum number of times of data movement.

The operation module 11 divides the unstored data according to sizes of the remaining configuration spaces of the plurality of register modules already stored with data, and stores the data segments into corresponding configuration spaces of the plurality of register modules already stored with data.

Then, the operation module 11 judges whether there is still a piece of unstored data to be processed (Step S270). If yes, the process returns to Step S210 to obtain another piece of unstored data for data configuration operations; otherwise, the process is ended.

Figure 6:
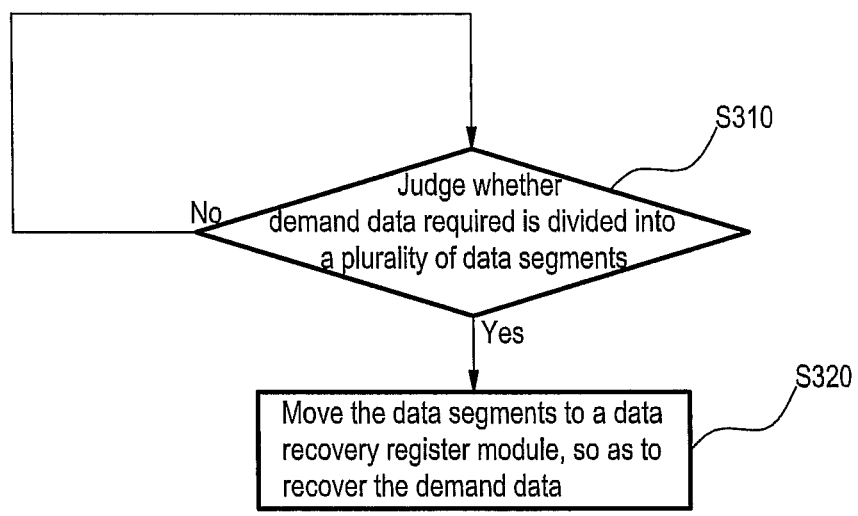
FIG. 6 is a schematic flow chart of subsequent steps of a method for configuring graphics register data according to an embodiment of the present invention.

FIG. 6 is a schematic flow chart of subsequent steps of a method for configuring graphics register data according to an embodiment of the present invention, which describes a process of recovering data segments that are stored in a distributed manner. Description is given below.

The operation module 11 judges whether demand data required by execution of an executive program is divided into a plurality of data segments and stored in a distributed manner in a part of the register modules already stored with data (Step S310). If yes, the operation module 11 moves the data segments to a data recovery register module, so as to recover the demand data (Step S320); otherwise, the process returns to Step S310.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A system for configuring graphics register data, applied in a mobile device to temporarily store a plurality of pieces of graphics operation data for displaying a picture, the system comprising:
a plurality of graphic registers; and
an operation processor, for obtaining a piece of unstored data from the graphics operation data, judging whether a graphic register already stored with data and having a remaining configuration space sufficient for configuring the unstored data exists among the plurality of graphic registers, so as to determine whether to store the unstored data into the graphic register already stored with data or to store the unstored data into a graphic register without storing data among the plurality of graphic registers, and when judging that no graphic register without storing data exists and the remaining configuration space of each graphic register already stored with data is insufficient for storing the unstored data, the operation processor comparing a data volume of the unstored data with the remaining configuration space of each graphic register already stored with data to divide and store the unstored data in a distributed manner into a part of the plurality of graphic registers already stored with data to fill up the remaining configuration space the part of the plurality of graphic registers already stored with data.

2. The system for configuring graphics register data according to claim 1, wherein the operation processor further analyzes the graphics operation data to establish a storage sequence corresponding to the graphics operation data, and obtains the unstored data from the graphics operation data according to the storage sequence.

3. The system for configuring graphics register data according to claim 2, wherein when analyzing the graphics operation data to establish a storage sequence corresponding to the graphics operation data, the operation processor further sorts the graphics operation data according to data volumes, so as to form the storage sequence.

4. The system for configuring graphics register data according to claim 2, wherein when analyzing the graphics operation data to establish a storage sequence corresponding to the graphics operation data, the operation processor further analyzes at least one program code corresponding to the graphics operation data to obtain a data read sequence of the graphics operation data before the at least one program code is executed, so as to form the storage sequence according to the data read sequence.

5. The system for configuring graphics register data according to claim 1, wherein the operation processor further selects at least one data recovery graphic register from the plurality of graphic registers, and when judging demand data required by execution of an executive program is a plurality of data segments stored in a distributed manner in a part of the graphic registers already stored with data, the operation processor moves the data segments to one of the at least one data recovery graphic register, so as to recover the demand data.

6. The system for configuring graphics register data according to claim 1, wherein when dividing the unstored data to be a plurality of data segments and storing the data segments in a distributed manner into a part of the graphic registers already stored with data, the operation processor first analyzes the remaining configuration space of each graphic register already stored with data, and obtains a minimum number of times of data movement required for recovering the unstored data when the data segments are configured in a part of the graphic registers already stored with data, so as to store the unstored data in a distributed manner into a part of the graphic registers already stored with data corresponding to the minimum number of times of data movement.

7. The system for configuring graphics register data according to claim 1, wherein when dividing and storing the unstored data in a distributed manner into a part of the graphic registers already stored with data, the operation processor divides the unstored data according to sizes of the remaining configuration spaces of the plurality of graphic registers already stored with data.

8. A method for configuring graphics register data, applied in a mobile device to temporarily store a plurality of pieces of graphics operation data for displaying a picture, wherein the mobile device comprises a plurality of graphic registers and an operation processor, the method comprising:
obtaining a piece of unstored data from the graphics operation data by the operation processor;
judging whether a graphic register already stored with data and having a remaining configuration space sufficient for configuring the unstored data exists among the plurality of graphic registers by the operation processor, so as to determine whether to store the unstored data into the graphic register already stored with data;

when judging that the remaining configuration space of each graphic register already stored with data is insufficient for storing the unstored data and a graphic register without storing data exists among the plurality of graphic registers, storing the unstored data into the graphic register without storing data by the operation processor; and when judging that no graphic register without storing data exists and the remaining configuration space of each graphic register already stored with data is insufficient for configuring the unstored data, comparing a data volume of the unstored data with the remaining configuration space of each graphic register already stored with data to divide and store the unstored data in a distributed manner into a part of the graphic registers already stored with data to fill up the remaining configuration space the part of the plurality of graphic registers already stored with data by the operation processor.

9. The method for configuring graphics register data according to claim 8, wherein the step of obtaining a piece of unstored data from the graphics operation data by the operation processor further comprises:

analyzing the graphics operation data to establish a storage sequence corresponding to the graphics operation data by the operation processor; and obtaining the unstored data from the graphics operation data according to the storage sequence by the operation processor.

10. The method for configuring graphics register data according to claim 9, wherein when analyzing the graphics operation data to establish a storage sequence corresponding to the graphics operation data, the operation processor further sorts the graphics operation data according to data volumes, so as to form the storage sequence.

11. The method for configuring graphics register data according to claim 9, wherein when analyzing the graphics operation data to establish a storage sequence corresponding to the graphics operation data, the operation processor further analyzes at least one program code corresponding to the graphics operation data to obtain a data read sequence of the graphics operation data before the at least one program code is executed, so as to form the storage sequence according to the data read sequence.

12. The method for configuring graphics register data according to claim 8, wherein the operation processor further selects at least one data recovery graphic register from the plurality of graphic registers, and the method further comprises:

when judging demand data required by execution of an executive program is divided into a plurality of data segments and stored in a distributed manner in a part of the graphic registers already stored with data, moving the data segments to one of the at least one data recovery graphic register by the operation processor, so as to recover the demand data.

13. The method for configuring graphics register data according to claim 8, wherein when dividing the unstored data to be a plurality of times of data and storing the data segments in a distributed manner into a part of the graphic registers already stored with data, the operation processor first analyzes the remaining configuration space of each graphic register already stored with data, and obtains a minimum number of times of data movement required for recovering the unstored data when the data segments are configured in a part of the graphic registers already stored with data, so as to store the unstored data in a distributed manner into a part of the graphic registers already stored with data corresponding to the minimum number of times of data movement.

14. The method for configuring graphics register data according to claim 8, wherein when dividing and storing the unstored data in a distributed manner into a part of the graphic registers already stored with data, the operation processor divides the unstored data according to sizes of the remaining configuration spaces of the plurality of graphic registers already stored with data.

15. A non-transitory recording medium, storing a computer readable program code, wherein a mobile device reads the program code to execute a method for configuring graphics register data, the mobile device is used for temporarily storing a plurality of pieces of graphics operation data for displaying a picture and comprises a plurality of graphic registers and an operation processor, and the method comprises:

obtaining a piece of unstored data from the graphics operation data by the operation processor;

judging whether a graphic register already stored with data and having a remaining configuration space sufficient for configuring the unstored data exists among the plurality of graphic registers by the operation processor, so as to determine whether to store the unstored data into the graphic register already stored with data;

when judging that the remaining configuration space of each graphic register already stored with data is insufficient for storing the unstored data and a graphic register without storing data exists among the plurality of graphic registers, storing the unstored data into the graphic register without storing data by the operation processor; and when judging that no graphic register without storing data exists and the remaining configuration space of each graphic register already stored with data is insufficient for configuring the unstored data, comparing a data volume of the unstored data with the remaining configuration space of each graphic register already stored with data to divide and store the unstored data in a distributed manner into a part of the graphic registers already stored with data to fill up the remaining configuration space the part of the plurality of graphic registers already stored with data by the operation processor.

16. The non-transitory recording medium according to claim 15, wherein the step of obtaining a piece of unstored data from the graphics operation data by the operation processor further comprises:

analyzing the graphics operation data to establish a storage sequence corresponding to the graphics operation data by the operation processor; and obtaining the unstored data from the graphics operation data according to the storage sequence by the operation processor.

17. The non-transitory recording medium according to claim 15, wherein the operation processor further selects at least one data recovery graphic register from the plurality of graphic registers, and the method further comprises:

when judging demand data required by execution of an executive program is stored in a distributed manner in a part of the graphic registers already stored with data to form a plurality of data segments, moving the data segments to one of the at least one data recovery graphic register by the operation processor, so as to recover the demand data.

\* \* \* \* \*